Jan. 24, 1928.
J. J. SEME
SHEARS
Filed March 25, 1926
1,656,923
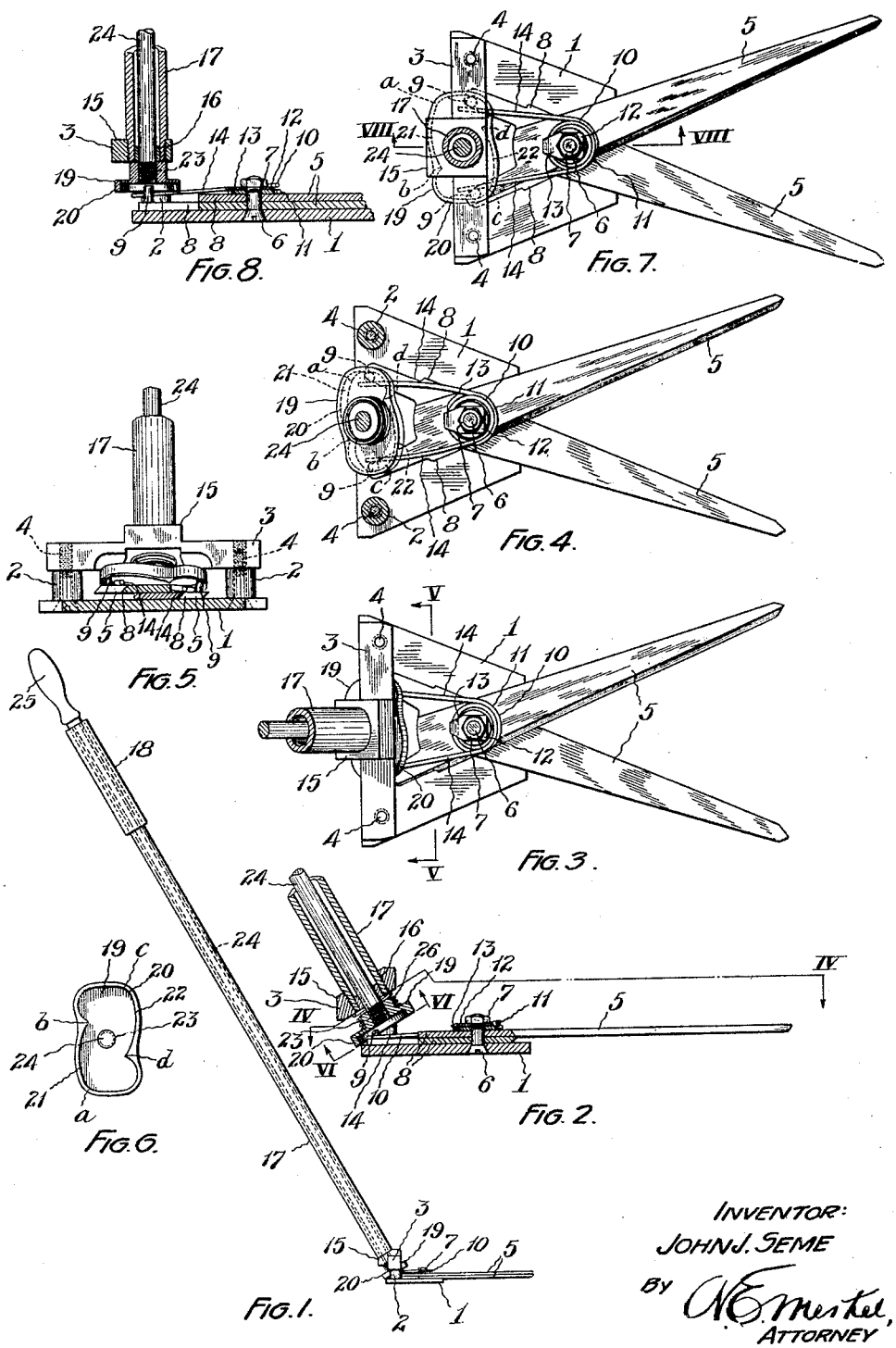
INVENTOR:
JOHN J. SEME
BY N. E. Merkel,
ATTORNEY Patented Jan. 24, 1928.

1,656,923

UNITED STATES PATENT OFFICE.

JOHN J. SEME, OF LAKEWOOD, OHIO.

SHEARS.

Application filed March 25, 1926. Serial No. 97,153.

My invention relates to shears and more particularly to what may be called garden shears, used for trimming grass and the like in places where the usual lawn-mower does not operate effectively.

The object of the invention is to provide means which will effectively perform a shearing operation close to the ground and which may be operated from a standing posture.

The invention may be embodied in various forms of which two forms are illustrated in the accompanying drawings for the purpose of clearly exemplifying the principles involved, and consists of the structure and combinations hereinafter described and claimed.

In the accompanying drawings:

Figure 1 is a side elevation of the complete shears, constructed in accordance with my invention;

Fig. 2 is an enlarged vertical longitudinal axial section of the lower part of the shears shown in Fig. 1;

Fig. 3 is a plan view of the lower portion of the shear mechanism;

Fig. 4 is a plan section on line IV—IV of Fig. 2, showing the cam employed to operate the shear blades;

Fig. 5 is a vertical cross section on line V—V of Fig. 3;

Fig. 6 is a view showing the inside of the cam, taken on line VI—VI of Fig. 2;

Fig. 7 is a plan view of the shears similar to Fig. 3 but showing a modified form of construction in which the handle is placed at right angles with the shear blades;

Fig. 8 is a fragmentary view, similar to Fig. 2, taken on line VIII—VIII of Fig. 7, showing the modified form of construction.

Referring to the drawings in detail, in which the same reference number is used throughout to designate the same part, a base plate 1 is provided with posts 2, connected by a cross-bar or bearing-bar 3. The posts 2 consist preferably of sleeves interposed between the base plate 1 and the bearing-bar 3, the bearing-bar being secured to the posts by means of screws 4 passing through the base plate and the sleeve and threaded into the bearing-bar.

Shear-blades 5 are mounted on the base plate and pivotally connected thereto and to each other by means of a screw-bolt 6 passing through the base plate and the blades, secured by a nut 7. The blades are provided with rearwardly extending arms 8, each provided at its rear end with an upwardly projecting pin 9. Means hereinafter described are provided for positively closing the blades; to cause them to automatically open, there is provided a spring 10 having a coil 11 surrounding the pivot 6, held in place by a plate 12 engaging the upper side of the coil and having a flange or lug 13 bent into engagement with the coil. From the coil extend rearwardly two arms 14 which rest against the pins 9. The spring is so tensioned as to hold the blades normally in an open position.

In the form of the device shown in Figs. 1 to 6, the handle member, by which the shear-blades are operated, is placed at an angle to the base. For this purpose the bearing-bar 3 is provided with an enlargement 15, preferably set at an angle to the base, such enlargement being provided with a threaded aperture 16, in which is threaded the lower end of a tubular handle 17. This handle is of a length such as to enable a user of the device to operate the shear-blades while in a standing posture. This tubular member may be of any desired cross-section, but it is preferably circular, and is provided at the upper end with a gripping part 18 to enable the same to be effectively held by the operator. This gripping part may be of any contour, but as shown in the drawings, is square in cross-section.

The closing motion of the shear-blades is given by a cam plate 19 which consists of a plate of general rectangular formation having an edge flange 20. This flange is formed into two internal cams 21—22, which, upon rotation thereof, engage the pins 9, thus causing the shear-blades to be closed. A detail of the cam is illustrated in Fig. 6. The cam surface of cam 21 extends from the point $a$ to the high point $b$, and cam surface 22 extends from the point $c$ to high point $d$. The curved parts of the flange 20 from the point $b$ to $c$ and from point $d$ to $a$ do not function as cam surfaces, but are formed as shown for a reason which will hereinafter appear in the description of the operation of the device.

Rotary motion may be given to this cam plate in any desired way, but as shown the central portion thereof is provided with a threaded aperture 23 in which is threaded the lower end of an operating rod 24 which extends upwardly through the tubular handle 17 and to the upper end of which is connected an operating handle 25.

In the form of the device shown in Figs. 1 to 6, the handle is arranged at an obtuse angle to the base plate and consequently the cam plate rotates in a plane at an acute angle with the plane of the base plate. Upon reflection it will be seen that the cam surfaces, upon rotation of the cam, tend to change their relation, in a vertical plane, to the pins 9. In order to accommodate this change of relation, and still maintain a cam surface of minimum width, I provide means whereby the cam plate may have limited motion between the base plate and the bearing-bar. This means consists in making the operating rod 24 of such length that it may shift up and down, to a limited extent. It is desirable, although not necessary, to automatically take up this lost motion; for this purpose I interpose a coil spring 26 between the cam plate and the bearing-bar.

*Operation.*—To operate the shears, the operator grasps the gripping handle 18 with the left hand and the operating handle 25 with the right hand and rotates the cam plate 19, such rotation causing the pins 9 on the shear-blades to be engaged simultaneously by the cam-surfaces 21—22. As soon as the pins 9 pass the high points *b*, *d*, of the cam plate, the spring 10 causes the pins to snap by the high points and come to rest at the ends of the cam plate. The curved portions of the cam plate from the points *b* to *c* and *d* to *a* are provided in order to permit the pins to pass quickly from the high points of the cam to the ends of the plate.

Figs. 7 and 8 show a slightly modified form in which the handle is placed at right angles to the base plate. When the handle is so placed, it is unnecessary to provide means whereby the cam plate may move up and down, relatively to the base plate, and therefore the coil spring 26 shown in Fig. 2, may be dispensed with.

Such lost motion would not be absolutely essential, even in the form disclosed in Figs. 1 to 6, as it is obvious that if the cam surface were of sufficient width and the pins were made of sufficient length, the cam could be rotated in a fixed plane and still operate the shear-blades effectively. However, in this case, the arrangement would not be as compact as that shown in the preferred form.

While I have shown two forms of the device, it is to be understood that they merely exemplify the principles involved. Many changes in the various details might be made without departing from the principles disclosed, and it is therefore to be understood that my invention is not confined to the particular construction shown, but includes all changes falling within the terms of the appended claims.

What I claim is:

1. In a device of the character described, a base, shear-blades pivotally mounted thereon and having arms extending rearwardly from the pivot, upwardly projecting pins at the rear ends of said arms, a tubular gripping handle fixed to said base and extending at an angle therefrom, a rotatable operating handle and a shaft connected therewith, the latter extending through the gripping handle; a cam at the lower end of the operating handle having cam surfaces cooperating with the pins in the arms of the shear blades to close same when said shaft is rotated in one direction, and means adapted to open the blades when the shaft is rotated in the opposite direction.

2. In a device of the character described, a base, shear-blades pivotally mounted thereon and having arms extending rearwardly from the pivot, upwardly projecting pins at the rear ends of said arms, a tubular gripping handle fixed to said base and extending at an angle therefrom, a rotatable operating handle having a shaft extending through the gripping handle, a cam plate on the lower end of the operating handle having cam surfaces cooperating with the pins in the arms of the shear-blades to close the same, and means to automatically open the blades.

3. The construction specified in claim 2 in which the gripping handle is arranged at an angle obtuse to the plane of the base.

4. The construction specified in claim 2 in which the gripping handle is arranged at an angle obtuse to the plane of the base, and the operating handle has a limited longitudinal motion through the gripping handle.

5. The construction specified in claim 2 in which the gripping handle is arranged at an angle obtuse to the plane of the base, the operating handle has a limited longitudinal motion through the gripping handle, and resilient means is interposed between the cam plate on the lower end of the operating handle and a fixed part of the base.

Signed by me this 23rd day of March, 1926.

JOHN J. SEME.